United States Patent
Brauckmann et al.

(10) Patent No.: US 11,037,604 B2
(45) Date of Patent: Jun. 15, 2021

(54) METHOD FOR VIDEO INVESTIGATION

(71) Applicant: IDEMIA Identity & Security Germany AG, Bochum (DE)

(72) Inventors: Michael Brauckmann, Witten (DE); Christian Dubray, Herne (DE); Andre Garstka, Dortmund (DE); Alexander Kolarow, Hattingen (DE); Maximilian Krueger, Bochum (DE); Martin Werner, Hemer (DE); Gero Willmes, Oer-Erkenschwick (DE); Christian Winter, Rheda-Wiedenbrueck (DE)

(73) Assignee: IDEMIA Identity & Security Germany AG, Bochum (DE)

( * ) Notice: Subject to any disclaimer, the term of this patent is extended or adjusted under 35 U.S.C. 154(b) by 0 days.

(21) Appl. No.: 15/481,284

(22) Filed: Apr. 6, 2017

(65) Prior Publication Data

US 2017/0294213 A1    Oct. 12, 2017

(30) Foreign Application Priority Data

Apr. 6, 2016   (EP) .................................... 16164044

(51) Int. Cl.
*G11B 27/34* (2006.01)
*G06K 9/00* (2006.01)
(Continued)

(52) U.S. Cl.
CPC .............. *G11B 27/34* (2013.01); *G06F 16/78* (2019.01); *G06F 16/784* (2019.01);
(Continued)

(58) Field of Classification Search
CPC ......... G06F 17/30793; G06F 17/30796; G06F 17/30817; G06K 2009/00738;
(Continued)

(56) References Cited

U.S. PATENT DOCUMENTS 8,259,995 B1 * 9/2012 Schendel .......... G06F 17/30268
382/100
10,026,446 B2 * 7/2018 Li ........................ G11B 27/005
(Continued)

FOREIGN PATENT DOCUMENTS

EP    2840786 A2    2/2015
GB    2472650 A     2/2011

OTHER PUBLICATIONS

European Search Report for European Application No. EP 16164044.6 dated Sep. 22, 2016.
(Continued)

*Primary Examiner* — Thai Q Tran
*Assistant Examiner* — Stephen R Smith
(74) *Attorney, Agent, or Firm* — Moore & Van Allen PLLC; Henry B. Ward, III

(57) ABSTRACT

The invention provides a method for processing and analyzing forensic video data using a computer program, the method comprising the steps of recording the forensic video data; providing supplementary data related to the recorded video data, wherein the supplementary data may be provided from or input by a source external of the computer program, in particular a human, or wherein the supplementary data may be extracted from the forensic video data by the computer program in an initial analyzing step; analyzing the forensic video data by the computer program using the supplementary data; and displaying a part of the forensic video data, the displayed part being based on a result of the analyzing step.

15 Claims, 10 Drawing Sheets

Figure 1:
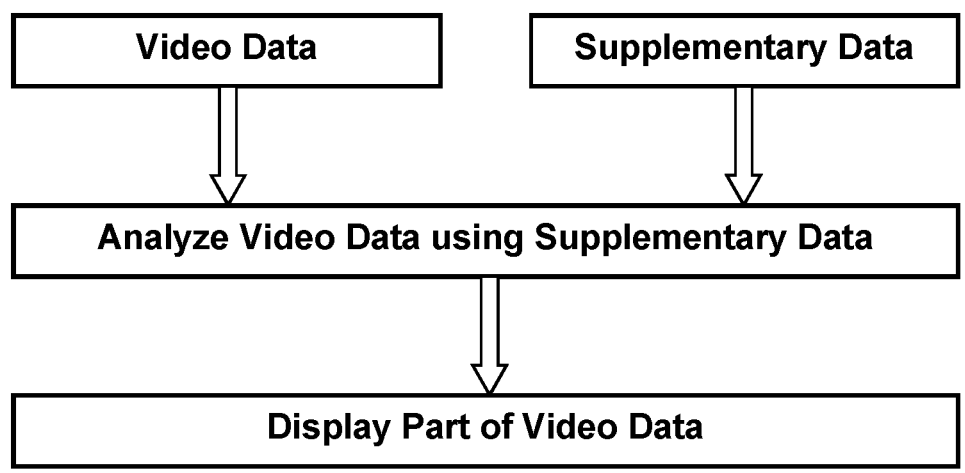

(51) Int. Cl.
G06F 16/783 (2019.01)
G06F 16/78 (2019.01)
G06K 9/46 (2006.01)
G11B 27/00 (2006.01)

(52) U.S. Cl.
CPC ..... *G06F 16/7844* (2019.01); *G06K 9/00228* (2013.01); *G06K 9/00718* (2013.01); *G06K 9/00771* (2013.01); *G06K 9/46* (2013.01); *G11B 27/005* (2013.01); *G06K 2009/00738* (2013.01); *G06K 2209/27* (2013.01)

(58) Field of Classification Search
CPC ........... G06K 2209/27; G06K 9/00228; G06K 9/00718; G06K 9/00771; G06K 9/46; G11B 27/005; G11B 27/34
USPC ....... 386/223, 241, 343, 248, 240, 224, 201; 382/103, 115, 118; 348/142, 143, 154, 348/155, 159; 707/736
See application file for complete search history.

(56) References Cited

U.S. PATENT DOCUMENTS

| | | | |
|---|---|---|---|
| 2008/0184245 A1 | 7/2008 | St-Jean | |
| 2009/0299725 A1* | 12/2009 | Grigsby | G06F 17/30817 704/2 |
| 2011/0018998 A1 | 1/2011 | Guzik | |
| 2011/0040754 A1* | 2/2011 | Peto | G06F 16/51 707/736 |
| 2012/0062732 A1* | 3/2012 | Marman | H04N 7/18 348/142 |
| 2013/0010111 A1 | 1/2013 | Laforte et al. | |
| 2013/0077835 A1* | 3/2013 | Kritt | G06K 9/00288 382/118 |
| 2013/0330055 A1* | 12/2013 | Zimmermann | G06F 16/78 386/240 |
| 2014/0092990 A1* | 4/2014 | Vuskovic | H04N 7/12 375/240.26 |
| 2014/0161314 A1 | 6/2014 | Ostrovsky-Berman et al. | |
| 2014/0169752 A1* | 6/2014 | May | G06F 16/7867 386/224 |
| 2014/0176708 A1* | 6/2014 | Ramakrishnan | G06K 9/00771 348/143 |
| 2014/0267735 A1 | 9/2014 | Carey | |
| 2014/0333776 A1* | 11/2014 | Dedeoglu | H04N 7/181 348/159 |
| 2014/0376786 A1* | 12/2014 | Johnson | G06K 9/00221 382/118 |
| 2015/0341599 A1* | 11/2015 | Carey | G06K 9/00342 348/150 |
| 2016/0005281 A1* | 1/2016 | Laska | G06K 9/00771 348/143 |
| 2016/0042767 A1* | 2/2016 | Araya | G11B 19/02 386/201 |
| 2016/0062992 A1 | 3/2016 | Chen et al. | |
| 2016/0063313 A1* | 3/2016 | Sandholm | H04L 9/3231 382/118 |
| 2016/0378749 A1* | 12/2016 | Lee | G06F 16/433 707/731 |
| 2016/0379059 A1* | 12/2016 | Gottschlich | G08B 13/19693 348/143 |
| 2017/0024385 A1* | 1/2017 | Drake | G11B 27/322 |
| 2017/0124385 A1* | 5/2017 | Ganong | G06K 9/00677 |
| 2017/0124834 A1* | 5/2017 | Pedersoli | G08B 27/001 |
| 2017/0169128 A1* | 6/2017 | Batchu Krishnaiahsetty | H04N 1/32122 |
| 2017/0169495 A1* | 6/2017 | Rathus | G06F 21/36 |
| 2017/0212910 A1* | 7/2017 | Morris | G06F 16/5838 |
| 2018/0046855 A1* | 2/2018 | Ganong | G06K 9/00248 |
| 2018/0197052 A1* | 7/2018 | Yanson | G06K 19/0614 |

OTHER PUBLICATIONS

Perrot A et al: "Real-time multimedia tagging and content-based retrieval for CCTV surveillance systems", Internet Multimedia Management Systems III, vol. 4862, Jul. 3, 2002 (Jul. 3, 2002), pp. 40-49, XP002430879, DOI: 10.1117/12.473049, ISBN: 978-1-62841-730-2.

Tahboub Khalid et al: "An intelligent crowdsourcing system for forensic analysis of surveillance video", Video Surveillance and Transportation Imaging Applications, vol. 9407, Mar. 4, 2015 (Mar. 4, 2015), pp. 940701-940701, XP060046470, DOI: 10.1117/12.2077807.

Lamberto Ballan et al: "Video Annotation and Retrieval Using Ontologies and Rule Learning", IEEE Multimedia, IEEE Service Center, New York, NY, US, vol. 17, No. 4, Oct. 2010 (Oct. 2010), pp. 80-88, XP011448568, ISSN: 1070-986X, DOI: 10.1109/MMUL.2010.4.

Vinay A et al: "Cloud Based Big Data Analytics Framework for Face Recognition in Social Networks Using Machine Learning", Procedia Computer Science, Elsevier, vol. 50, May 8, 2015 (May 8, 2015), pp. 623-630, XP029589902, ISSN: 1877-0509, DOI: 10.1016/J.PROCS.2015.04.095.

Examination Report issued for corresponding European Patent Application No. EP16164044.6 dated Feb. 7, 2019.

Examination Report issued by the European Patent Office for European Patent Application No. 16164044.6, dated Feb. 25, 2021.

La Vigne, Nancy G. et al.: "Chapter 8. How is video footage used in investigations?"; In: "Using Public Surveillance Systems for Crime Control and Prevention: A Practival Guide for Law Enforcement and Their Municipal Partners," The Urban Institute, Washington, DC, USA, Sep. 14, 2011 (Sep. 14, 2011), pp. 1-78, XP055778113, ISBN:978-1-935676-35-5.

* cited by examiner

METHOD FOR VIDEO INVESTIGATION

FIELD OF THE INVENTION

The invention refers to a method for processing and analyzing forensic video data using a computer program.

PRIOR ART

Video analysis has become a significant forensic resource for investigation processes related to crimes and during court proceedings. Since the introduction of video as a forensic resource, the volume of available video data has increased dramatically, in particular with sources such as mobile phones and social media, in addition to surveillance cameras at streets, places and stadiums, for example. Analysts and investigators involved with using these video data as an investigative resources face an enormous workload. An existing software platform offers an easy and efficient user interface built on a set of video analytics. The purpose of this platform is to process and analyze large quantities of video data. The embedded algorithms process video sequences by detecting, recording, and classifying the depicted elements of interest. As the software sorts through volumes of raw data, the video analyst can start a review based on the most relevant data, saving the time and effort normally spent watching the entire video. The platform includes algorithms that support automated video data processing and detect and track movements in raw video, and classify data extracted from the video sequences into categories such as Metadata and Persons. However, there is a need for a further reduction in the time required for analyzing the video sequences.

DESCRIPTION OF THE INVENTION

The invention provides a method for processing and analyzing forensic video data using a computer program according to claim 1. Preferred embodiments are defined in the dependent claims.

Claim 1 is directed to a method for processing and analyzing forensic video data using a computer program, the method comprising the steps of recording the forensic video data; providing supplementary data related to the recorded forensic video data, wherein the supplementary data may be provided from or input by a source external of the computer program, in particular a human, or wherein the supplementary data may be extracted from the forensic video data by the computer program in an initial analyzing step; analyzing the forensic video data by the computer program using the supplementary data; and displaying a part of the forensic video data, the displayed part being based on a result of the analyzing step. The forensic video data is generally digital forensic video data and the step of recording the forensic video data may comprise the step of storing the forensic video data in one or more forensic video data files, in particular a plurality of forensic video data files. The forensic video data is video data that is or may be relevant for investigating a breaching of the law, such as a criminal or an administrative offence. The supplementary data related to the recorded forensic video data may be provided from or input by an external source or the supplementary data may be extracted from the forensic video data by the computer program in an initial analyzing step. For performing the analyzing step, the additional step of importing the forensic video data and the supplementary data into the computer program may be performed.

The advantage of the method according to the invention is that the supplementary data that are provided are used for analyzing the video data in addition to the video data as such, so as to more efficiently present relevant video material to a user of the computer program. Specifically, only a part of the video data is displayed, so as to reduce the time for viewing the video data.

The method may further comprise the step of assigning priority levels to the video data. The assigned priority levels of the video data may define the order in which the video data are analyzed. This is preferably performed when a forensically relevant event has occurred and the video data are assigned priority levels depending on the temporal and/or spatial distance to the event, such that the priority level of recorded video data having a relatively smaller distance to the event is higher than the priority level of recorded video data having a relatively larger distance from the event. In addition or alternatively the analyzing step may comprise the step of assigning priority levels to the video data and the displayed part may have a preselected priority level. Accordingly, important parts of the video data (for example based on tags associated with a frame or a sequence of frames in the video data) may be presented first to the user.

The step of providing supplementary data may comprise providing a tag related to an object of interest in the video data; and storing the tag in association with the video data, in particular in a header of a file comprising the video data or including a link between the tag and the video data. A tag is a piece of information that is related to the video data, in particular information related to an object of interest therein, such a keyword or a short text/description.

The tag may be provided by a human and may result from being inserted during an upload process or from using a public web interface or a mobile app allowing tagging the video data manually. Alternatively, an automatic tagging can be provided by a video recording device that records or has recorded the video data or by a personal cloud based service, such as face recognition in a social network, in particular this may comprise the further step of verifying the provided tags by one or more different humans. This has the advantage of distributing the workload of human investigators and making the most relevant material faster available for them than the less relevant material, by making use of additional meta data added by humans manually before.

The tag may be provided automatically and the method may comprise the further step of validating the tag by a user of the computer program, in particular comprising displaying non-validated tags and validated tags differently. This provides for a distinction of trust levels for the tags.

The step of providing supplementary data may comprise generating the supplementary data by interaction of a human with a video recording device during recording the video data, wherein the supplementary data preferably include at least one of a flag, a trigger, and a tag; in particular comprising the further step of executing an algorithm to identify the flag or trigger and tagging the video data with a tag depending on the identified flag or trigger. Accordingly, an intentional adding of meta data on a video scene for later usage is possible, directly out of the scene itself without having direct access to the video material itself. The interaction of the human with the video recording device may be a direct physical interaction, e.g. touch interaction, or may be an indirect interaction via a human gesture that is interpreted by the video recording device, or via other optical or acoustical signals sent by the human to the video recording device.

The step of providing supplementary data may comprise the step of providing time and/or location and/or orientation of a video recording device having recorded the video data. For each recording camera or recorded video the time, location and orientation of the video material may be either directly provided by the recording device, or may be identified/calculated later by the investigation software either automatically or by human assistance.

Further, a plurality of video data may be provided by a plurality of video recording devices and the step of displaying may comprise displaying a map of the location of the video recording devices and/or displaying a time bar indicating availability of video data from the plurality of video recording devices at different times and/or for a particular view area of interest. On the timebar the human investigator can check which videos are available for a certain point of time and what areas have been recorded, respectively may determine which areas are not covered (blind spots).

A plurality of video data may be processed and the step of providing supplementary data may comprise the step of providing data on an event having occurred, in particular a time and/or location of the event; and the step of analyzing the plurality of video data may comprise selecting video data related to the event data, in particular selecting video data covering the location and/or time of the event. Based on the time and/or location of the event (such as an explosion) or a user-defined event (such as the event that a user has identified a person at a specific time and/or location), video data may be processed in descending priority, where the priority is descending with increasing temporal and/or spatial distance to the event. The spatial distance involves the location of the video recording device (such as a surveillance camera) and its area of view (surveillance area). Moreover, there may be possibility to adjustably select a temporal and/or spatial range around the event. Supplementary data related to events from other sources (social media, emergency calls, etc) that are not directly linked to the video material may also be used to prioritize the processing of the video data.

This processing may further comprise the step of assigning priority levels to the plurality of video data based on the event data and the step of analyzing the plurality of video data may be performed based on the assigned priority levels.

In combination with the step of providing a tag related to an object of interest in the video data the step of analyzing may comprise creating a text file for each of the video data, the text file including a listing of tags and/or identified objects, in particular further comprising hyperlinks pointing to positions in the video data related to the tags and/or objects. This reduces the processing time by providing a brief summary of the video to the human investigator to allow choosing the most relevant video to be investigated next and, in particular, then directly jump to the relevant content.

The step of analyzing may comprise providing to a user of the computer program suggestions for a text relevant for describing a content of the video data. Therefore, text blocks may be generated automatically out of the visible scene and meta data of the video data, and the user may choose an appropriate text block, to be added to a report and modify or extend it if required.

The step of analyzing may comprise locating at least two activity levels in the video data, preferably at least two activity levels related to at least one of motion, sound and occurrence of an object of interest in the video data; wherein the step of displaying may comprise displaying the video data with a first speed at positions where the activity level is at a first level and at a second speed at positions where the activity level is at a second level, or wherein the step of displaying may comprise displaying the video data with a first speed at positions where the activity level is at a first level and jumping to the next position in the video data having the first activity level thereby skipping the positions where the activity level is at a second level; in particular wherein the first speed is lower than the second speed and the first activity level is higher than the second activity level. Specifically, the speed of displaying the video data may be related to the activity level in a continuous manner, such that an increase in the activity level results in a decrease of the display speed (for example the displaying speed may be inversely proportional to the activity level). This has the advantage of executing a video investigation without the need for plenty human interactions with the computer program (investigation software). In this case, the supplementary data may correspond to or comprise the at least two activity levels.

The analyzing step may comprise identifying an object of interest in the video data. An object of interest may for example be a person, a face, a car, a license plate, a box, a suit case, etc.

The analyzing step may comprise identifying an object of interest in the video data and selecting at least one frame out of the video data including the object of interest, in particular a sequence of frames and/or a representative frame including the object of interest, and assigning a tag to the selected at least one frame. Such a selected at least one frame may be used as a representation of the object of interest in the displaying step (displaying a "best shot" or representative video sequence).

This step may further comprise the step of displaying a tag cloud with a plurality of tags for a plurality of video data based on the number of occurrences of the respective tags in the plurality of video data, in particular wherein the size and/or colour of the displayed tags in the tag cloud may depend of the number of occurrences of the respective tag; wherein preferably each tag may be associated with a hyperlink to the respective position in the plurality of video data related to the tag. This provides information of the relevance of the tags in a tag cloud in order to show content statistic of one or multiple videos. In addition, for example clicking on an item in the tag cloud may open a list of hyperlinks to the different videos allowing the user to jump directly into the corresponding video scene. The tag cloud may be designed dynamically, such that it depends on the temporal and/or spatial region that is currently analyzed. Accordingly, the tag cloud (i.e. the plurality of displayed items/tags) adapts when changing the temporal and/or spatial region. The tag cloud may be displayed for all video data under consideration or for a selection of video data and/or for a particular range in time and/or for a particular location.

Further features and advantages of the present invention will be described in the following with reference to the figures, which illustrate only examples of embodiments of the present invention. The illustrated and described features may be suitably combined with each other.

DRAWINGS

Figure 2:
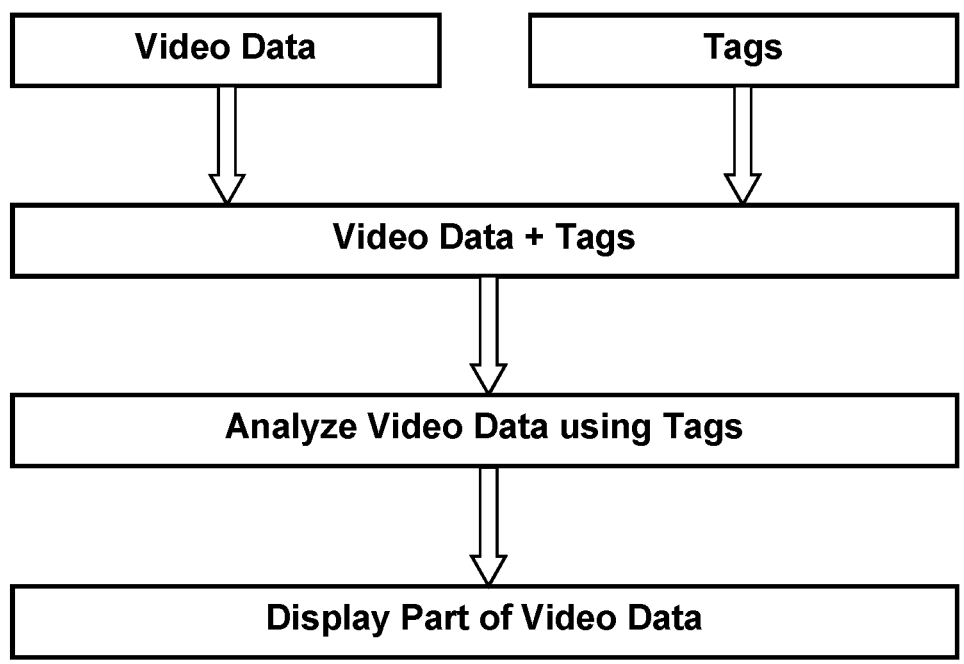
Figure 3:
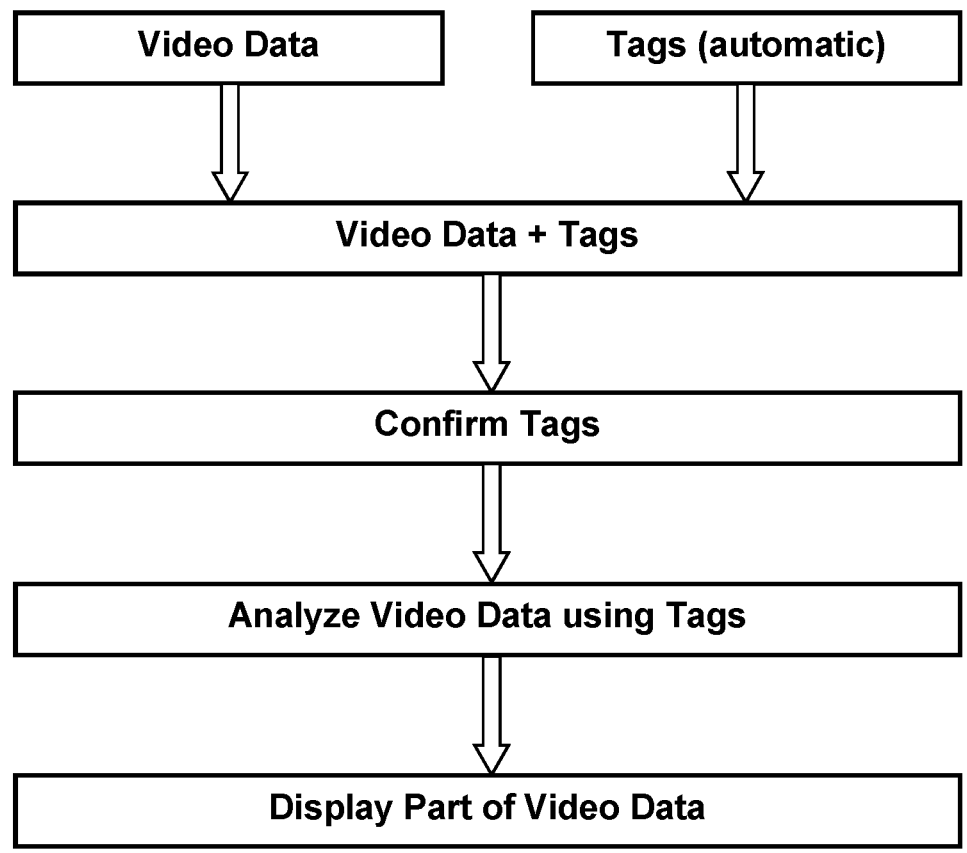
Figure 4:
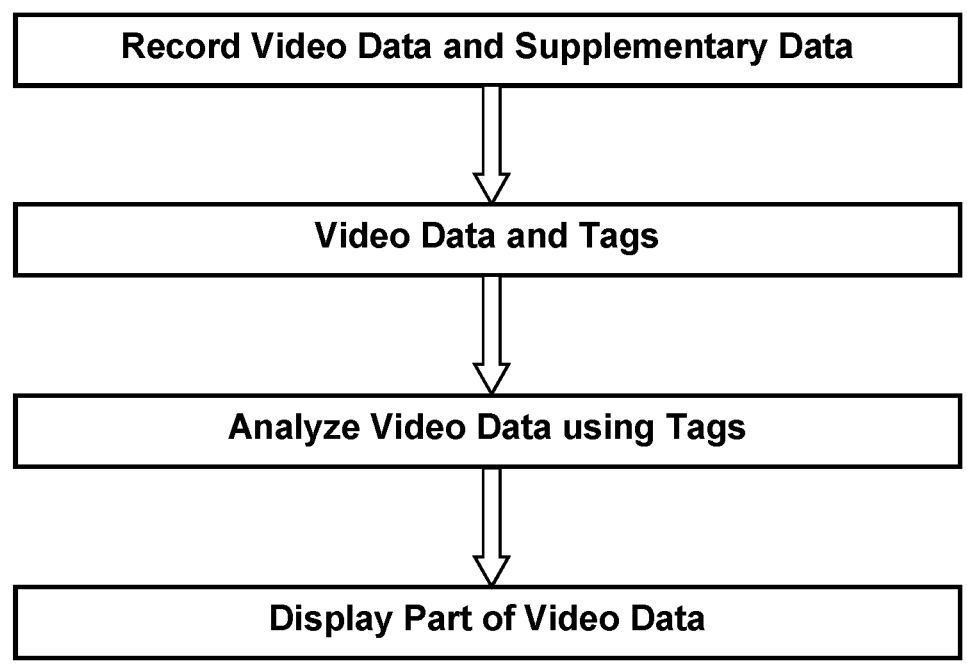
Figure 5:
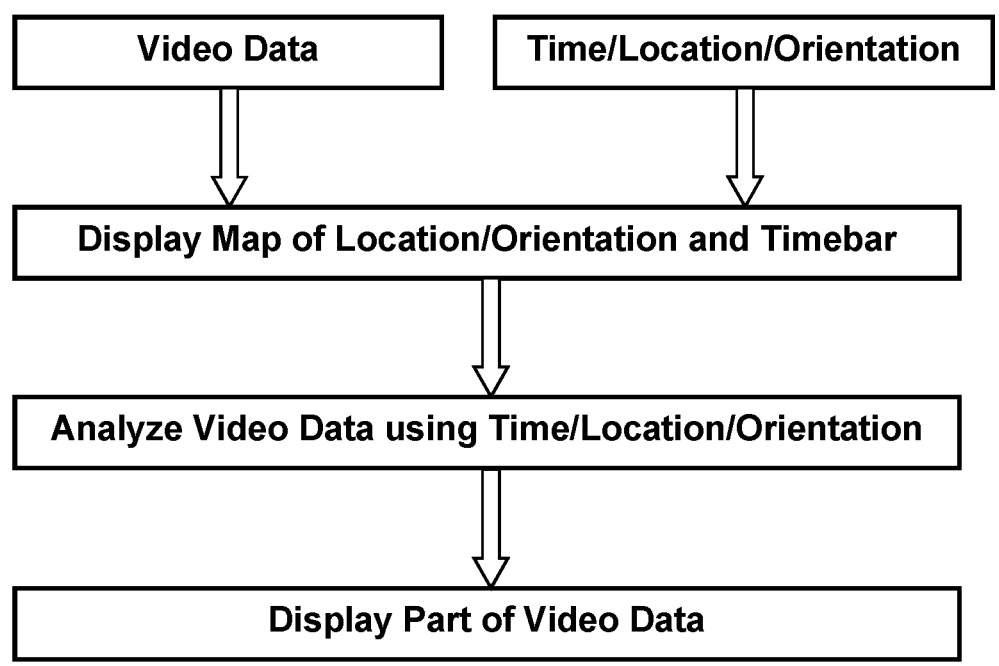
Figure 6:
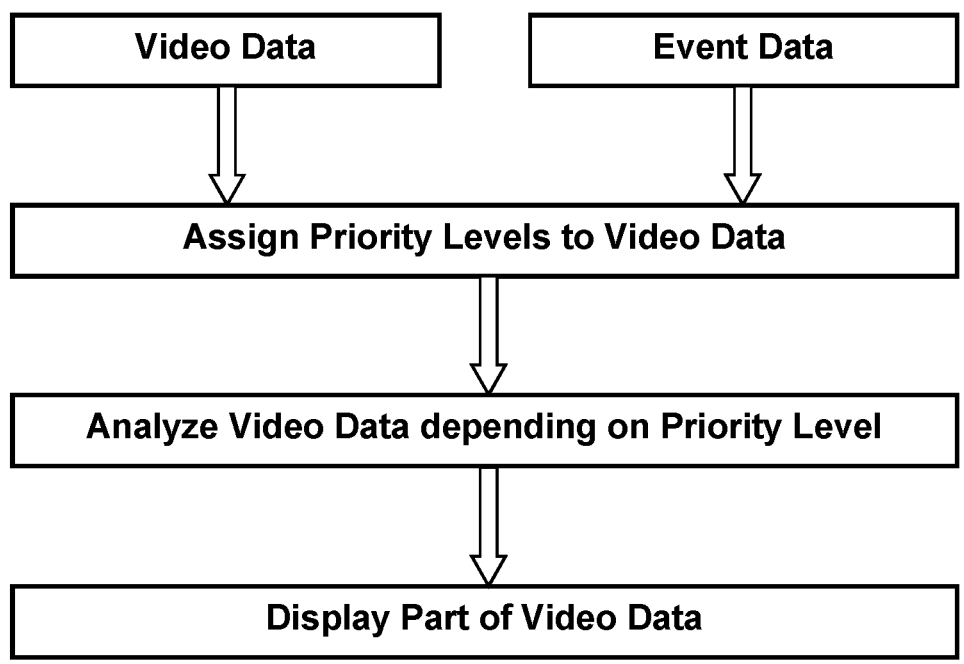

FIG. 1 illustrates a first embodiment of the invention.
FIG. 2 illustrates a second embodiment of the invention.
FIG. 3 illustrates a third embodiment of the invention.
FIG. 4 illustrates a fourth embodiment of the invention.
FIG. 5 illustrates a fifth embodiment of the invention.
FIG. 6 illustrates a sixth embodiment of the invention.

Figure 7:
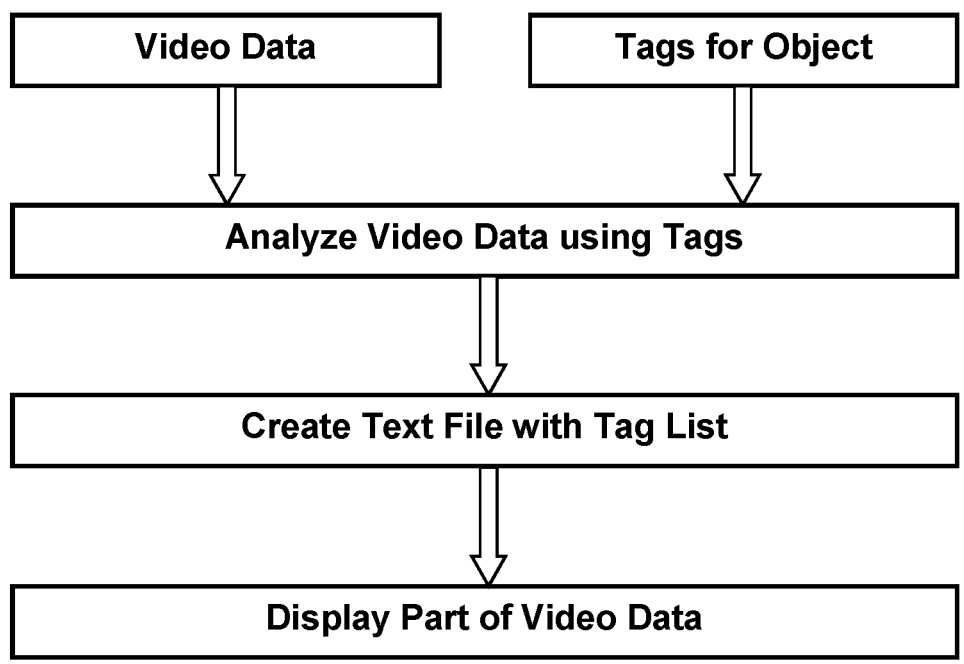
Figure 8:
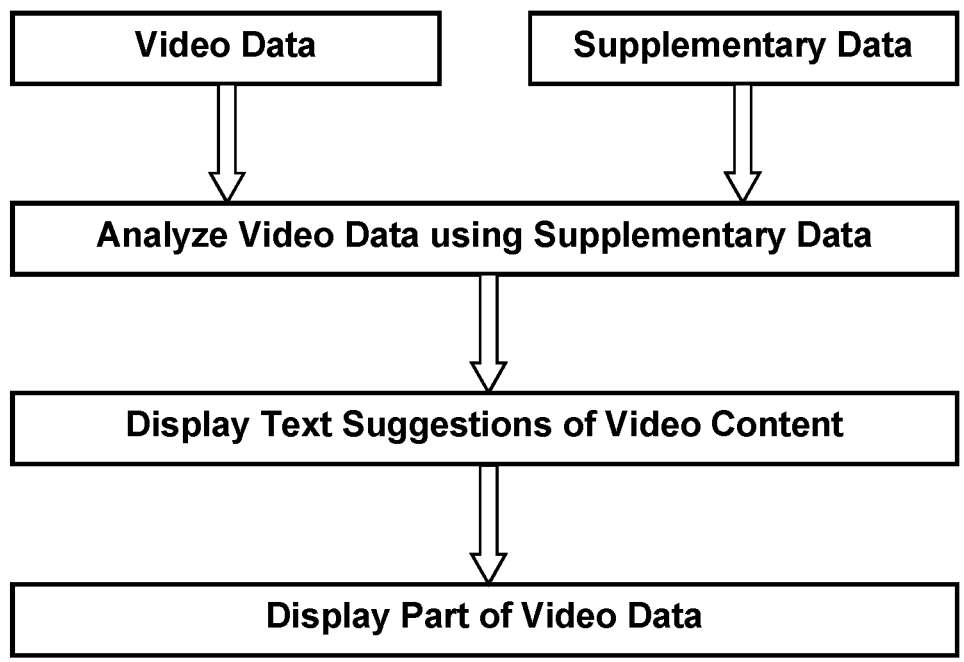
Figure 9:
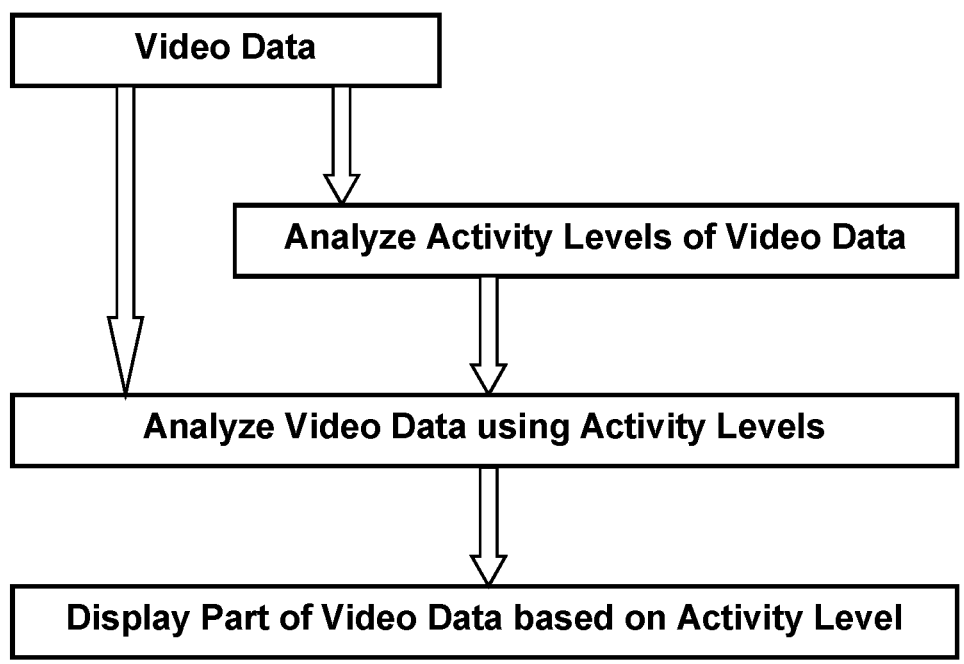
Figure 10:
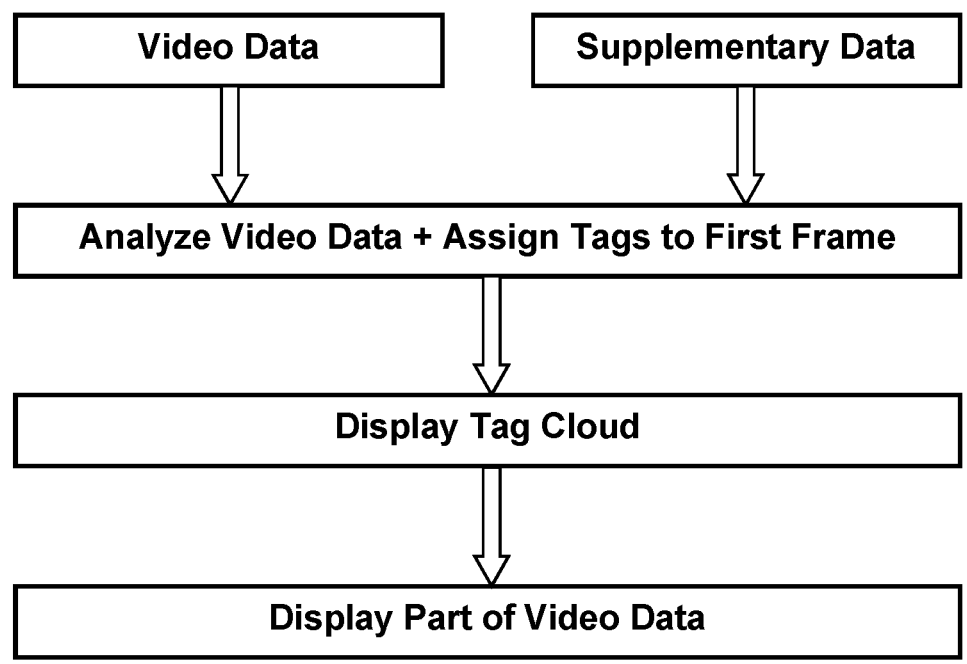

FIG. 7 illustrates a seventh embodiment of the invention.
FIG. 8 illustrates an eighth embodiment of the invention.
FIG. 9 illustrates a ninth embodiment of the invention.
FIG. 10 illustrates a tenth embodiment of the invention.

EMBODIMENTS

A general outline of the method according to the invention is presented in the following. Forensic video material (forensic video data) data may be recorded by surveillance cameras. Further, today most of the people have the ability to record audio and video material anytime and anywhere, using their mobile phone. In case of a serious event or attack there is usually a lot of such material available. This material needs to be analyzed by the police during the investigation. Analysis requires many people and many working days to scan the huge amount of material submitted by the population. With the help of available software tools the analysis time can be reduced quite dramatically compared to a pure manual review of all the submitted material.

However, even with this software there is nevertheless too much data submitted by the population, so that an investigation cannot be completed in a timely manner. Material which is more likely to be helpful for the investigation should therefore be quicker available to the human investigator than material with no (or less) relevant information for the investigation. Therefore the available video material has to be processed in a particular order by the software. An early prioritization helps to produce investigation results faster. According to the method of the invention, the computer program (video investigation tool) imports plain data (video, audio, image) and data with additional information. The video investigation tools can import and analyze these data according to a prioritization based on details the investigator has defined as most relevant in the tool. The investigation software may add further data onto the material like face detection, movements and number plates of vehicles by identifying frames where an object of interest is included. In a next step the human investigator analyses the material and the added information and may add even more information manually to the material. During the investigation the operators of the video investigation tool may add relevant meta information onto the material to be investigated.

The existing material needs to be processed in an efficient and quick way by human investigators. This can be done according to the first embodiment of the invention as illustrated in FIG. 1 by using supplementary data related to the recorded video data, analyzing the video data by the computer program using the supplementary data, and displaying a part of the video data that is based on a result of the analyzing step.

According to the second embodiment of the invention as illustrated in FIG. 2, the step of providing supplementary data may comprise providing a tag related to an object of interest in the video data; and storing the tag in association with the video data, in particular in a header of a file comprising the video data or including a link between the tag and the video data. A tag is a piece of information that is related to the video data, in particular an object of interest therein, such a keywords or a short description. The tag may be provided by a human and may result from being inserted during an upload process or from using a public web interface or a mobile app allowing tagging the video data manually or from using an automatic tagging provided by a cloud based service, such as face recognition in a social network, in particular this may comprise the further step of verifying the provided tags by one or more different humans.

Specifically, the recording device (which may also be the device to upload the recorded material to a server of a law enforcement agency) may analyze the recorded video material (for example perform a motion analysis and/or face detection) so that this does not have to be done by the law enforcement agency. Moreover, the recording/uploading device may perform an automatic tagging.

Therefore, according to the second embodiment of the invention the method may be further specified by distributing the workload of human investigators and making the most relevant material faster available for them than the less relevant material, by making use of additional meta data added by humans manually before. People who recorded the material may be asked to provide a description of the video data during the upload procedure. A public web front-end or a mobile app may be provided to allow users to tag their own videos manually. Alternatively an automatic (but private) tagging mode making use of cloud based services (e.g., like Facebook) may be used. An additional public user interface or application does for example perform a motion analysis and ask user to describe what they see on these scenes by adding tags. The software may offer some pre-defined labels/tags depending on the investigation case. In case a verification of tags added by those people is required a peer-review mode can be executed. In a first step the public may be asked to pre-analyze the videos they upload by themselves. In a second step other people may be asked to verify/confirm these manually added tags by the first person. According to the second embodiment the public may be included for video analysis by providing tools for video analysis to the public before they upload their material for investigation. Use can be made of existing public services from the internet, by asking the public to get the material analyzed by their "social media tools" and upload the material extended with the "knowledge" of their cloud services. For example face recognition can be performed in the cloud and directly mapped to a real name.

According to the third embodiment of the invention as illustrated in FIG. 3, the tag may be provided automatically and the method may comprise the further step of validating the tag by a user of the computer program, in particular comprising displaying non-validated tags and validated tags differently. This provides for a distinction of trust levels for the tags.

Material from different sources may be related to each other, this relationship can be build based on the video content itself as well as on meta data and tags added to certain frames included in the material. Different video materials need to be synchronized manually by human investigators. Therefore the different video scenes can be arranged on a timescale and location map within the investigation software similar to a video editing tool. Computer systems and human users may add tags on video scenes. A sufficient distinction between tags assigned automatically by a computer system, tags added manually by human users and tags which correctness have been validated or proofed is required. According to the third embodiment the users of the software are allowed to validate and confirm automatically assigned tags. Different symbols for manually added and automatically added tags may be used (for example "#" for manual tags and "." for automatic tags, like face, number plates, buses, trains, cars, dogs). Once an automatic created tag has been validated by a human investigator the symbol can for example be changed from "." to "#" to indicate the higher confidence level of this tag. Therefore, automatically created tags may be validated by human users.

According to the fourth embodiment of the invention as illustrated in FIG. 4, the step of providing supplementary data may comprise generating the supplementary data by interaction of a human with a video recording device during recording the video data, wherein the supplementary data preferably include at least one of a flag, a trigger, and a tag; in particular comprising the further step of executing an algorithm to identify the flag or trigger and tagging the video data with a tag depending on the identified flag or trigger. The interaction of the human with the video recording device may be a direct physical interaction, e.g. touch interaction, or may be an indirect interaction via a human gesture that is interpreted by the video recording device, or may be an interaction via other optical or acoustical signals sent by the human to the video recording device.

Police officers need to write a report, explain a situation in textform and might refer to a video. According to the fourth embodiment adding of information related to video scenes may be done directly by a person visible on the video or recording the video (e.g. a police officer). A notification (Flag, Trigger or Tag) usable for later video investigation may be added directly on the video within the scene. Adding the notification (e.g. the tagging) itself can be done for example by a special gesture or movement or any other optical or acoustical signal or by manipulating (e.g. activating a key on/pressing a button on) the recording device. A special investigation algorithm looking for such notifications (triggers) may be executed on the video material which than adds tags on the video material. Thus, an intentional adding of meta data on a video scene for later usage, directly out of the scene itself without having direct access to the video material itself is provided.

According to the fifth embodiment of the invention as illustrated in FIG. 5, the step of providing supplementary data may comprise the step of providing time and/or location and/or orientation of a video recording device having recorded the video data. For each recording camera or recorded video the time, location and orientation of the video material may be either directly provided by the recording device, or may be identified/calculated later by the investigation software either automatically or by human assistance. Further, a plurality of video data may be provided by a plurality of video recording devices and the step of displaying may comprise displaying a map of the location of the video recording devices and/or displaying a time bar indicating availability of video data from the plurality of video recording devices at different times and/or for a particular view area of interest.

When analyzing video scenes sometimes the user wants to see the scene from a different perspective or areas not visible in the current scene but very close thereto. Another camera might have recorded exactly the part the user interested in. It is, however, difficult to figure out that such video material from another camera is available. Moveable cameras, cameras on same x/y coordinates but on different z coordinate (floors of buildings, stadiums, . . . ) may be involved. A solution is for example to provide a 2D map with multiple layers (floors) or a 3D map in order to distinguish between video scenes on different floors/levels. According to the fifth embodiment, a 2D or 3D map may be combined with a timescale/timebar, which shows positions of the different video scenes available in the investigation software/the computer program. Cameras in the map may appear, disappear or change their orientation over time depending on the video material they have recorded. On the timescale the human investigator can check which videos are available for a certain point in time and what areas have been recorded, respectively which areas are "blind spots". For each camera (or video) the time, location and orientation of the video material need to be either directly provided by the recording device, or identified/calculated later on within the investigation software either automatically or by human assistance. Time scrollbar on a map which indicates/highlights the areas recorded during the selected time.

According to the sixth embodiment of the invention as illustrated in FIG. 6, a plurality of video data may be processed and the step of providing supplementary data may comprise the step of providing data on an event having occurred, in particular a time and/or location of the event; and the step of analyzing the plurality of video data may comprise selecting video data related to the event data, in particular selecting video data covering the location and/or time of the event. This processing may further comprise the step of assigning priority levels to the plurality of video data based on the event data and the step of analyzing the plurality of video data may be performed based on the assigned priority levels. Based on the time and/or location of the event (such as an explosion) or a user-defined event (such as the event that a user has identified a person at a specific time and/or location), video data may be processed in descending priority, where the priority is descending with increasing temporal and/or spatial distance to the event. The spatial distance involves the location of the video recording device (such as a surveillance camera) and its area of view (surveillance area). Moreover, a temporal and/or spatial range around the event may be select adjustably.

As there is often a lot of material which needs to be imported and investigated—an early prioritization does help to produce investigation results faster. Prioritization is conventionally done manually by the human investigators. Usually a big bunch of material is uploaded into the video investigation tool and then first processed automatically one by one. Only after all the material has been processed automatically the human investigators start the manual but tool based analysis. The sixth embodiment provides for a faster processing of data by human investigators and helps to identify the most relevant material for investigation. Additional data is used to prioritize the analysis of the video material. Additional data could for example be gathered out of emergency calls, or activities on social media platforms like Twitter. Once such an event occurs video material from that location and time can be analyzed with high priority—maybe even in real-time. Accordingly, the video investigation software is linked with an external prioritization mechanism. By default the system will process the material for a dedicated case according to the defined (standard) priority—or just process one file after the other. In case that a certain event is monitored on external channels (emergency call, social media), the system adopts the prioritization of the videos to be imported. Additional data (events) from other sources (social media, emergency calls, . . . ) not directly linked to the video material is used in order to prioritize the processing of the same.

According to the seventh embodiment of the invention as illustrated in FIG. 7, in combination with the step of providing a tag related to an object of interest in the video data the step of analyzing may comprise creating a text file for each of the video data, the text file including a listing of tags and/or identified objects, in particular further comprising hyperlinks pointing to positions in the video data related to the tags and/or objects.

Usually there is large amount of video data to be analyzed within the investigation of a single case. However, a brief summary of what is visible on the video is missing. Every single video needs to be analyzed sequence by sequence. There are algorithms available searching for persons, faces, license plates and movements. When watching the video scenes these recognized items are marked with boxes directly inside the video. In order to decrease the processing time of video analysis, according to the seventh embodiment, a brief summary of the video is provided to the human investigator to allow choosing the most relevant video to be investigated next. For each video or scene a brief summary, script or story board in text form is created. A user can read the text report and decide whether to analyze the video directly or at a later stage. Examples for such a brief summary are the following: 8 different cars, 20 people–12 male, 8 female, one red-T-Shirt, etc. Hyperlinks may be included on the text report which points to different positions in the video material. Accordingly, a text file is created for each video listing all the tags and automatically identified objects. This reduces the efforts of video analysis based on pure text analysis to take advantage of existing text analysis methods.

According to the eighth embodiment of the invention as illustrated in FIG. 8, the step of analyzing may comprise providing to a user of the computer program suggestions for a text relevant for describing a content of the video data.

Human video investigators have to provide written reports and therefore need to describe the video scenes in words. Conventionally, the human investigators have to type in what they see on the videos. In case of frequently used keywords or tags the software does offer the user some suggestions which they can easily select without the need to completely type it again. The suggestions made conventionally by the software are based on previously used terms, but are not linked to the video scene itself. According to the eighth embodiment the video scene as well as the related/included meta data are analyzed to provide suitable text suggestions relevant for the video scene which an investigator can use to create a report (or add annotations to certain video sequences), for example "Bus xyz arrives at Bus Stop London Street", "X people leave the bus", "Persons enters building Universitätsstraße 160". Textblocks can be generated automatically out of the visible scene and supplementary data of the videos, and the user can choose an appropriate textblock, add it to a report and modify or extend it if required. Therefore, according to this embodiment, suggestions based on the video content instead of previously used inputs are provided.

According to the ninth embodiment of the invention as illustrated in FIG. 9, the step of analyzing may comprise locating at least two activity levels in the video data, preferably at least two activity levels related to at least one of motion, sound and occurrence of an object of interest in the video data; wherein the step of displaying may comprise displaying the video data with a first speed at positions where the activity level is at a first level and at a second speed at positions where the activity level is at a second level, or wherein the step of displaying may comprise displaying the video data with a first speed at positions where the activity level is at a first level and jumping to the next position in the video data having the first activity level thereby skipping the positions where the activity level is at a second level; in particular wherein the first speed is lower than the second speed and the first activity level is higher than the second activity level.

Conventionally, video material needs to be analyzed by a human investigator and there is a lot of interaction with the software required in order to view all the available material in a timely manner. Video material may be pre-analyzed by the software and dedicated events visible in the video can be marked. The user can then quickly jump from one marked position to the other. However, jumping from one position to the other still requires lot of interaction with the software. It is difficult for the user to stay concentrated during analysis of long video scenes. According to the ninth embodiment, the scene and the context is analyzed by the computer program to automatically control the playback of the video without human interaction being required. Via human interaction the playback can still be controlled by the human operator of the software. The playback speed and zooming or marking of special areas can be controlled automatically by the software, so that the human investigator can be guided quickly to the interesting scenes of the videos without many manual actions required. The playback speed of videos can be adjusted depending on the visible scene (no motion→fast, motion or face detection→slower). The same fast forward can also or alternatively be done until a special sound is heard (starting car, people talking, explosion). This "sound" can be specified. In order to make it easier for the human investigator not only the playback speed of the video is been adjusted, but it is also possible to zoom automatically the part where motion or a face is detected. Other options are to put the attention of human operator on certain parts of the scene by colorizing the part with movement while the rest is shown in black & white, or by highlighting the motion in another way (boxes, arrows, . . . ). Accordingly, a human video investigation can be performed without the need for many human interactions with the investigation software by implementing this context sensitive playback according to the ninth embodiment.

According to the tenth embodiment of the invention as illustrated in FIG. 10, the analyzing step may comprise identifying an object of interest in the video data and selecting a frame out of the video data including the object of interest, in particular a frame with the first occurrence of the object of interest, and assigning a tag to the selected frame. Such a selected frame may be used as a representation of the object of interest in the displaying step. This step may further comprise the step of displaying a tag cloud with a plurality of tags for a plurality of video data based on the number of occurrences of the respective tags in the plurality of video data, in particular wherein the size and/or colour of the displayed tags in the tag cloud may depend of the number of occurrences of the respective tag; wherein preferably each tag may be associated with hyperlinks to the respective positions in the plurality of video data related to the tag.

Within video investigation tools often several thousand videos need to be analyzed and mapped. It is difficult for human users to have a good overview of the different video sequences. Tag clouds (tag cloud programs) are available to display the occurrence of specific words or topics within text based material. Video content has to be transformed into a text based information first, before a Tag, respectively Tag cloud can be created.

A tag in a video cannot easily be found like a word in a text document. Therefore the tag has to include additional information like the frame number or timestamp as well as the video source file name itself. According to the tenth embodiment, pictures/frames are extracted out of the video material and tags are assigned to those pictures, so called "best shots". Such a picture could for example be the first frame when a face recognition algorithm has identified a person. Then this frame is marked with a tag #face and if possible also with a tag #name. The text based tag clouds are applied to video material, respectively on the tags added to the video material and the "best shots". A tag cloud is created in order to show content statistic of one or more videos. Clicking on an item in the tag cloud may show a list of hyperlinks to the different videos (incl. timestamp) allowing to jump directly into the video scene. Text based data is created from video material to present this in a tag cloud in order to allow quick and easy navigation through a big number of different video materials. A tag cloud is created for example based on the number of occurrence of each tag (best shot) and on the duration of a tagged object being visible in the scenes. For example the tag "car" may become bigger in case there are many different scenes with cars, but also or alternatively if there is one scene showing a car for long time.

The described embodiments are exemplary and not intended to be limiting. The full scope of the invention is defined in the appended claims.

The invention claimed is:

1. Method for processing and analyzing forensic video data using a computer program, the method comprising the steps of: recording a plurality of forensic video data comprising visible scene data;
providing supplementary data related to the recorded plurality of forensic video data, including providing data on an event having occurred, wherein the data includes at least one selected from the group of (i) a time of the event and (ii) a location of the event;
assigning priority levels to the plurality of forensic video data based on the event data by assigning a higher priority to visible scene data covering the event and a lower priority level to visible scene data not covering the event;
wherein the supplementary data is provided according to at least one selected from the group of (i) provided from or input by a source external of the computer program, and (ii) extracted from the forensic video data by the computer program in an initial analyzing step;
analyzing the plurality of forensic video data by the computer program using the supplementary data comprising selecting forensic video data covering at least one selected from the group of the location of the event and the time of the event, wherein analyzing comprises analyzing the visible scene data and supplementary data to provide a user of the computer program suggestions for text content relevant for describing each of a plurality of scenes within the forensic video data, wherein the suggestions for text content comprise textual content extracted from both the visible scene data and the supplementary data and, in response to the user approving the suggested text content or editing the suggested text content, creating a plurality of text files from at least the suggested or edited text content, each text file associated with a scene within the forensic video data, the text file including a listing of (i) tags, (ii) identified objects and (iii) hyperlinks pointing to positions in the forensic video data related to at least one selected from the group consisting of the tags and the identified objects; and displaying a part of the forensic video data, the displayed part being based on a result of the analyzing step, wherein the video data is processed in an order of descending priority, where the priority is descending with at least one selected from the group of (i) increasing temporal distance to the event and (ii) increasing spatial distance to the event.

2. Method according to claim 1, wherein the step of providing supplementary data comprises:
providing a tag related to an object of interest; and
storing the tag according to at least one selected from the group of (i) in a header of a file comprising the forensic video data, and (ii) including a link to a frame of the forensic video data file that includes the object of interest.

3. Method according to claim 2, wherein the tag results from using a tagging provided by a cloud-based service for face recognition in a social network, the method comprising the further step of verifying the provided tags.

4. Method according to claim 3, wherein the step of providing supplementary data comprises:
providing a tag related to an object of interest in the forensic video data; and
storing the tag according to at least one selected from the group of (i) in association with the forensic video data in a header of a file comprising the forensic video data, and (ii) including a link between the tag and a frame of the forensic video data file that includes the object of interest.

5. Method according to claim 3, comprising the further step of validating the tag by a user of the computer program by displaying non-validated tags and validated tags differently.

6. Method according to claim 3, wherein the step of providing supplementary data comprises:
generating the supplementary data by at least one selected from the group of (i) interaction with a video recording device and (ii) providing a predefined gesture or a signal in the video data itself by a recorded person during recording the forensic video data, wherein the supplementary data includes at least one selected from the group of a flag, a trigger, and a tag;
executing an algorithm to identify the generated at least one selected from the group of the flag, trigger, and tag; and
tagging the video data with a tag depending on the identified at least one selected from the group of the flag, trigger, and tag.

7. Method according to claim 2, comprising the further step of validating the tag by a user of the computer program by displaying non-validated tags and validated tags differently.

8. Method according to claim 2, wherein the step of providing supplementary data comprises:
generating the supplementary data by at least one selected from the group of (i) interaction with a video recording device and (ii) providing a predefined gesture or a signal in the video data itself by a recorded person during recording the forensic video data, wherein the supplementary data includes at least one selected from the group of a flag, a trigger, and a tag;
executing an algorithm to identify the generated at least one selected from the group of the flag, trigger, and tag; and
tagging the video data with a tag depending on the identified at least one selected from the group of the flag, trigger, and tag.

9. Method according to claim 1, wherein the step of providing supplementary data comprises:
generating the supplementary data by at least one selected from the group of (i) interaction of a human with a video recording device and (ii) providing a predefined gesture or a signal in the video data itself by a recorded person during recording the forensic video data wherein the supplementary data comprises at least one selected from the group of a flag, a trigger, and a tag; and executing an algorithm to identify the generated flag or trigger, and tagging the video data with a tag depending on the identified flag or trigger.

10. Method according to claim 1, wherein the step of providing supplementary data comprises:
providing at least one selected from the group of (i) time, (ii) location and (iii) orientation of a video recording device having recorded the forensic video data.

11. Method according to claim 10, wherein a plurality of forensic video data is provided by a plurality of video recording devices and wherein the step of displaying comprises at least one selected from the group of (i) displaying a map of the location of the video recording devices and (ii) displaying a time bar indicating availability of at least one selected from the group of (a) forensic video data and (b) video coverage from the plurality of video recording devices according to at least one selected from the group of (1) at different times and (2) for a particular view area of interest, and wherein the step of displaying further comprises displaying at least one selected from the group of a temporal and a spatial video coverage of the plurality of the video recording devices in an animated representation in the map.

12. Method according to claim 1, wherein the step of analyzing comprises locating at least two activity levels in the forensic video data, wherein the at least two activity levels are related to at least one selected from the group of motion, sound and occurrence of an object of interest in the forensic video data; and
wherein the step of displaying comprises displaying the forensic video data with a first speed at positions where the activity level is at a first level and at a second speed at positions where the activity level is at a second level; or
wherein the step of displaying comprises displaying the forensic video data with a first speed at positions where the activity level is at a first level and jumping to the next position in the video data having the first activity level thereby skipping the positions where the activity level is at a second level; and
wherein at least one selected from the group of (i) the first speed is lower than the second speed and the first activity level is higher than the second activity level, (ii) the step of displaying comprises adapting the speed of displaying the video data to the activity level in a continuous manner such that an increase in the activity level results in a decrease of the display speed and a decrease in the activity level results in an increase of the display speed, at least within a predefined range of the activity level, and (iii) the step of displaying comprises adapting at least one selected from the group of a zoom level and a color representation of the displayed forensic video data to the activity level.

13. Method according to claim 1, further comprising the step of displaying a tag cloud with a plurality of tags for a plurality of forensic video data based on the number of occurrences of the respective tags in the plurality of forensic video data, wherein at least one selected from the group of a size and a colour of the displayed tags in the tag cloud depend of the number of occurrences of the respective tag;
wherein at least one selected from the group of (i) the tag cloud is displayed dynamically, such that at least one selected from the group of the size and the colour of the displayed tags in the tag cloud depends on at least one selected from the group of a temporal and a spatial region that is currently analyzed, (ii) the tag cloud is displayed for all video data under consideration or for a selection of video data including at least one selected from the group of a particular range in time and a particular location, and (iii) each tag is associated with a hyperlink to the respective position in the plurality of forensic video data related to the tag.

14. Method according to claim 1, including adjustably selecting at least one selected from the group of (i) a temporal range, and (ii) a spatial range around the event.

15. Method according to claim 1, wherein additional data resulting from emergency calls or activities on social media platforms is used to prioritize the analysis of the video material.

* * * * *